July 5, 1927.
W. B. McLAUGHLIN
1,634,295
METHOD AND MANUFACTURE OF FRUIT PRESERVES
Filed March 25, 1924
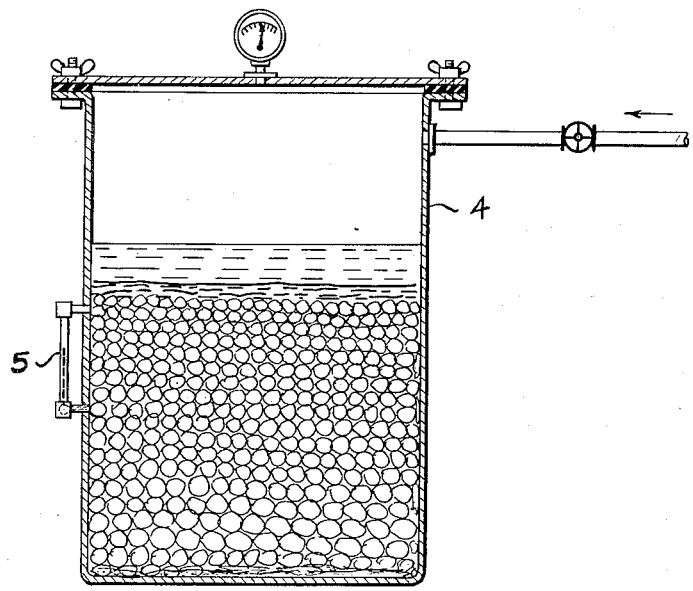
INVENTOR
Wharton B. McLaughlin
BY
Pennie, Davis, Marvin & Edmonds
his ATTORNEYS Patented July 5, 1927.

1,634,295

UNITED STATES PATENT OFFICE.

WHARTON B. McLAUGHLIN, OF NEW YORK, N. Y.; CELIA BROWN McLAUGHLIN ADMINISTRATRIX OF SAID WHARTON B. McLAUGHLIN, DECEASED.

METHOD AND MANUFACTURE OF FRUIT PRESERVES.

Application filed March 25, 1924. Serial No. 701,812.

This invention relates to improvements in the preserving of fruit and involves the provision of an improved method of preserving fruit and of an improved preserved fruit product. The object of the invention is to provide an improved preserved fruit having substantially the same characteristic flavor and physical form as the natural fruit.

In accordance with the invention the fruit is preserved by the incorporation of sugar into the fruit substance in such a manner that the original form and characteristic flavor remain substantially unaltered except for the increased sweetness. The invention is applicable to the preservation of all fruits which are capable of being preserved by the incorporation of sugar therein, and thus the invention includes the preserving of berries. The fruit may be preserved whole or in fragments, portions, or pieces of any suitable size.

The accompanying drawing shows in cross-section, partly in elevation, a typical form of container capable of accomplishing the method of the present invention, but it is to be understood that the present method can be carried out in widely varying forms of containers, the present form being chosen merely for purposes of illustration.

In carrying out the invention the fruit to be preserved is placed in a container such as that shown in the drawing as 4, which can be made gas tight, covering the fruit with a paste consisting of syrup with a large excess of sugar, closing the container, applying and maintaining within the container a gas pressure on the mass equal to or in excess of the osmotic pressure between the fruit juice in the interior of the fruit cell and the saturated sugar solution on the outside of it. The contents of the container are maintained by a suitable thermometer, such as 5 in the drawing, at a temperature below 45 degrees Fahrenheit or if a more rapid process is preferred, after closing the container the contents are brought to 170 degrees Fahrenheit for one hour. Under these conditions the sugar passes into the fruit cell and the shrinkage which ordinarily takes place when the osmotic pressure is not neutralized is prevented.

The rapidity with which the osmotic pressure between the interior of the fruit cell and the surrounding sugar solution is equalized, varies with and depends upon the size and condition of the piece operated upon. In the case of berries and some of the small fruits it is not necessary to remove the outer integument, usually the equalization is practically complete within 72 hours. The amount of sugar entering into the fruit is determined by the concentration of the syrup at the end of the operation and can be varied at the will of the operator, and the full fruit flavor retained. The only products resembling my improved product and then only in the fact that the sugar to cellulose ratio is largely increased in the finished product, are the crystallized or glacéd fruits; these products are made by long standing (three or four weeks) in a syrup which is repeatedly withdrawn and repeatedly boiled; the process begins with a low grade and ends with a saturated syrup; practically all of the fruit flavor being lost in this process. In my process one pasteurization serves to preserve the fruit until the sugar saturation makes its preservation permanent and practically no flavor is lost. The berry or fruit is now removed from the syrup and preferably sun-dried, the resulting product is my new article of manufacture and is characterized by being soft, easily masticated and having the sugar to cellulose ratio more than double that existing in the natural fruit.

Having now described my invention I claim:

1. The method of preserving fruit which consists in exposing it to the action of a concentrated sugar solution at a temperature below the boiling temperature of the natural fruit juices; maintaining on the solution a pressure in excess of the osmotic pressure between the juice within the cell of the fruit and the surrounding sugar solution until the desired amount of sugar is incorporated in the fruit substance.

2. An article of manufacture consisting of fruit preserved by a saturated sugar solution in its substance substituted for a portion of its uncoked natural juice.

3. An article of manufacture consisting of a fragment of a fruit preserved by a saturated sugar solution in its substance substituted for a portion of its uncooked natural juice.

Signed at Port Limon, Republic of Costa Rica, this eighteenth day of February, A. D., 1924.

WHARTON B. McLAUGHLIN.